US012522102B2

(12) United States Patent
Bucher et al.

(10) Patent No.: US 12,522,102 B2
(45) Date of Patent: Jan. 13, 2026

(54) AUTONOMOUS REPLENISHMENT OF RESOURCES

(71) Applicant: Agtonomy, South San Francisco, CA (US)

(72) Inventors: Timothy Bucher, Geyserville, CA (US); Steven Holmes, Redwood City, CA (US); Robert Culbertson, South San Francisco, CA (US); Harjot Bal, South San Francisco, CA (US); Aaron Leiba, South San Francisco, CA (US); Nicholas Fischer, San Francisco, CA (US)

(73) Assignee: AGTONOMY, South San Francisco, CA (US)

( * ) Notice: Subject to any disclaimer, the term of this patent is extended or adjusted under 35 U.S.C. 154(b) by 200 days.

(21) Appl. No.: 18/335,834

(22) Filed: Jun. 15, 2023

(65) Prior Publication Data

US 2023/0391223 A1    Dec. 7, 2023

Related U.S. Application Data

(60) Provisional application No. 63/365,712, filed on Jun. 2, 2022.

(51) Int. Cl.
*B60L 53/80* (2019.01)
*A01B 69/00* (2006.01)
*A01B 69/04* (2006.01)

(52) U.S. Cl.
CPC ............ *B60L 53/80* (2019.02); *A01B 69/008* (2013.01); *B60L 2200/40* (2013.01)

(58) Field of Classification Search
CPC ...... B60L 53/80; B60L 2200/40; B60L 50/64; A01B 69/008; Y02T 10/7072
See application file for complete search history.

(56) References Cited

U.S. PATENT DOCUMENTS

| | | | |
|---|---|---|---|
| 7,828,099 B2 | 11/2010 | Heckeroth | |
| 2003/0029149 A1* | 2/2003 | Fillman | A01D 34/58 56/10.6 |
| 2011/0251935 A1* | 10/2011 | German | G06Q 40/12 700/218 |
| 2012/0181981 A1 | 7/2012 | Wechlin et al. | |
| 2016/0368464 A1* | 12/2016 | Hassounah | B60L 53/80 |
| 2017/0349039 A1 | 12/2017 | Rayner et al. | |
| 2017/0355354 A1 | 12/2017 | Hassounah | |
| 2020/0373781 A1* | 11/2020 | Lee | B60L 53/22 |
| 2021/0035077 A1 | 2/2021 | Rayner | |
| 2022/0144220 A1 | 5/2022 | Boyce et al. | |
| 2022/0183209 A1* | 6/2022 | Scott-Robinson | A01B 69/008 |

FOREIGN PATENT DOCUMENTS

WO    2011/161471 A2    12/2011

OTHER PUBLICATIONS

International Search Report and Written Opinion of the International Searching Authority dated Oct. 27, 2023 as received in Application No. PCT/US2023/029357.

* cited by examiner

*Primary Examiner* — Rodney A Butler
(74) *Attorney, Agent, or Firm* — Maschoff Brennan

(57) ABSTRACT

An agricultural vehicle that includes a removable energy module configured to provide energy to power operations of the agricultural vehicle and a connection interface. The connection interface is configured to autonomous mechanically and electrically couple and decouple the removable energy module to the agricultural vehicle.

17 Claims, 9 Drawing Sheets

AUTONOMOUS REPLENISHMENT OF RESOURCES

RELATED APPLICATIONS

The present application claims priority to U.S. Provisional Patent Application No. 63/365,712, filed on Jun. 2, 2022, the entire contents of which are incorporated by reference in the present disclosure.

FIELD

The present disclosure is generally directed towards autonomous replenishment of resources.

BACKGROUND

Unless otherwise indicated herein, the materials described herein are not prior art to the claims in the present application and are not admitted to be prior art by inclusion in this section.

Farming and agricultural ventures are often associated with labor intensive work and long hours. In some circumstances, long hours may be attributed to large tracts of land and numerous crops that may be included in an operation. In some instances, tractors and other large machinery may be configured with autonomous systems and related components such that the tractors and other large machinery may operate independent of an operator.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

BRIEF SUMMARY

In an embodiment, an agricultural vehicle that includes a removable energy module configured to provide energy to power operations of the agricultural vehicle and a connection interface. The connection interface is configured to autonomous mechanically and electrically couple and decouple the removable energy module to the agricultural vehicle.

These and other aspects, features and advantages may become more fully apparent from the following brief description of the drawings, the drawings, the detailed description, and appended claims.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
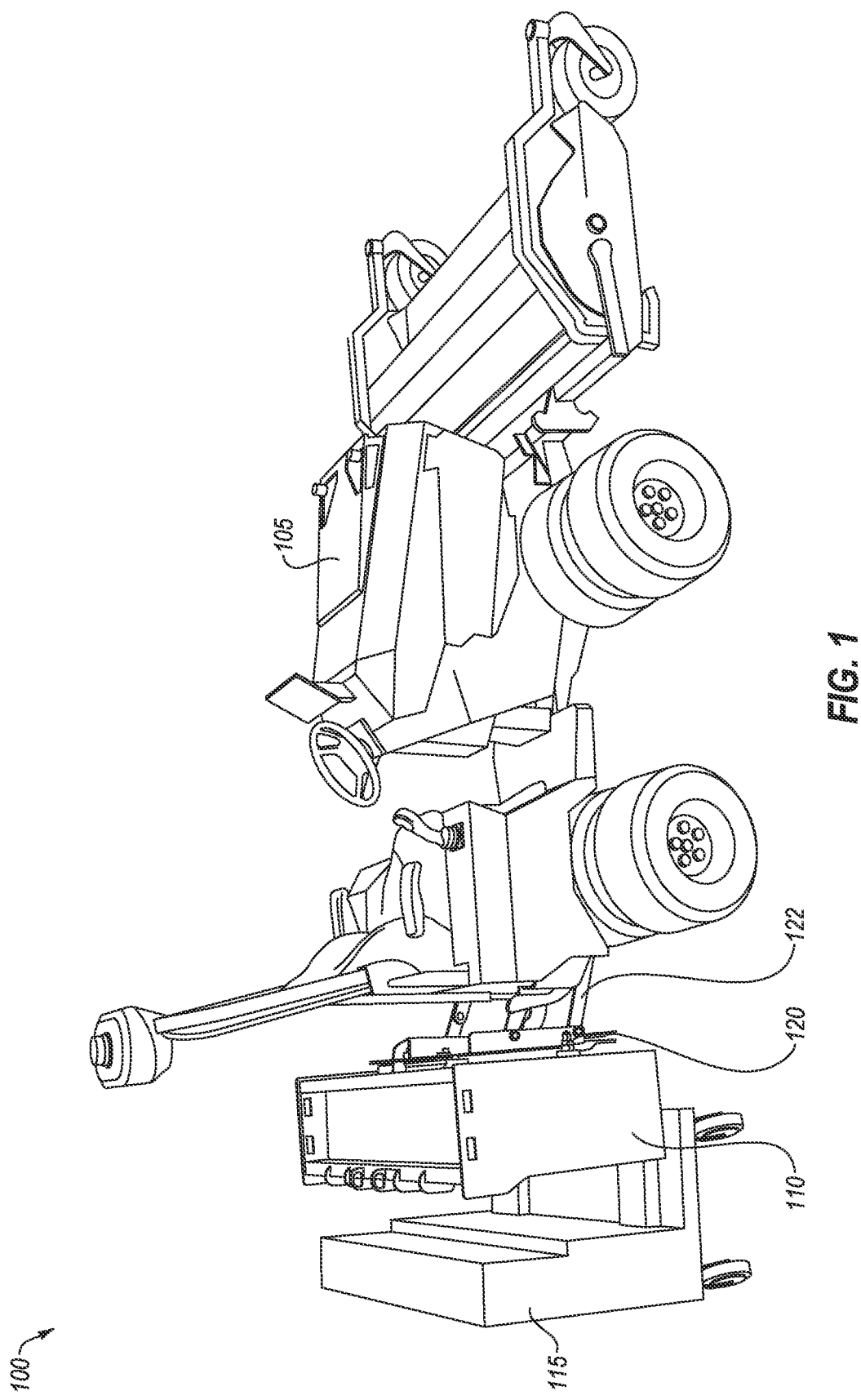
FIG. 1 illustrates an example environment for autonomous replenishment of resources.

Agricultural undertakings, including farming, are often time consuming and of a large scale such that power vehicles and equipment provide a great benefit in accomplishing tasks related thereto. Tractors and other agricultural equipment may be used to help reduce the amount of time required to cultivate land and/or crops. In some circumstances, autonomous vehicles, including autonomous tractors, may further contribute to the efficiency and productivity of the agricultural undertaking by reducing the amount of hands-on time by an operator.

An autonomous vehicle may be configured to perform tasks without direct supervision and/or input from an operator. In some circumstances, an autonomous vehicle may be configured to perform tasks or operations as desired and/or directed by the operator. In some circumstances, the operations of an autonomous vehicle may be limited by a resource amount that may be supported by the autonomous vehicle, which may include portable energy, such as a battery or fuel, and/or deliverable product, such as pesticides, herbicides, seeds, and the like. For example, an autonomous vehicle may be powered by a battery, which after a period of time, may become drained and no longer operational. In another example, an autonomous vehicle may transport an amount of deliverable product that may be less than a total amount of deliverable product to be used in an operation.

In instances in which the battery of the autonomous vehicle is below a threshold energy level, the operator may direct the autonomous vehicle to be charged. Alternatively, or additionally, the operator may swap the depleted battery with a charged battery such that operations by the autonomous vehicle may continue. In some circumstances, large operations may include long hours of operation of the autonomous vehicle, which may include frequent and/or multiple charges or battery swaps, which may cause disruptions to the operator. Alternatively, or additionally, swapping batteries may not be feasible by the operator due to large battery size, heavy weight, and/or inaccessibility of the battery due to the battery location on the autonomous vehicle.

In some embodiments of the present disclosure, an autonomous replenishment of resources may reduce the amount of time an operator may allocate to oversight of an autonomous vehicle. Alternatively, or additionally, the autonomous replenishment of resources may enable the autonomous vehicle to complete an operation regardless of a size of the operation or a length of time to complete the operation. For example, an autonomous vehicle implementing autonomous replenishment of resources may be capable of autonomously completing an operation (e.g., without operator input including battery charging or swapping, refueling, replenishing deliverable products, etc.) that may be more time and/or product intensive than may be completed with a fixed amount of resources.

In some embodiments, a method may direct an autonomous vehicle to navigate to a first charging station in response to a first energy level of a first energy module being below a threshold. The method may also direct the first energy module to transfer energy to the second energy module in response to a second energy level of a second energy module being below a threshold. The method may direct the autonomous vehicle to align with the first charging station. The method may cause the first energy module to electrically decouple from the autonomous vehicle and align first module contacts on the first energy module with first station contacts on the first charging station. The method may cause the first module contacts to electrically couple with the first station contacts. The method may release the first energy module. The method may direct the autonomous vehicle to align with a second charging station, the second charging station including a third energy module. The method may cause the autonomous vehicle to pick up and electrically couple with the third energy module.

In the present disclosure, autonomous vehicle may refer to an agricultural tractor and/or other power equipment or vehicles that may be used in an agricultural setting. Alternatively, or additionally, while discussed in primarily an agricultural setting, autonomous vehicle may be used in other settings, such as mining, construction, and/or other locales where autonomous machinery may be beneficial.

FIG. 1 illustrates an example environment 100 for autonomous replenishment of resources, in accordance with at least one embodiment described in the present disclosure. The environment 100 may include an autonomous vehicle 105, an energy module 110, and a replenishment station 115. The autonomous vehicle 105 may include a connection interface 120 coupled to the autonomous vehicle 105 via articulating arms 122.

The energy module 110 may be configured to provide energy to power operations of the autonomous vehicle 105. For example, energy module 110 may be a battery. Alternately or additionally, the energy module 110 may be store a fuel that may be used as energy for the autonomous vehicle 105.

The connection interface 120 may be configured to removably couple the energy module 110 to the autonomous vehicle 105. For example, the connection interface 120 may be configured to autonomous mechanically and electrically couple and autonomous mechanically and electrically decouple the energy module 110 to the autonomous vehicle 105. For example, the connection interface 120 may be positioned next to the energy module 110. The articulating arms 122 may move the connection interface 120 in a direction substantially perpendicular to a normal of the surface of the energy module 110 to engage the connection interface 120 with the energy module 110. Engaging the connection interface 120 with the energy module 110 may electrically and mechanically couple the energy module 110 to the autonomous vehicle 105. After engaging the energy module 110 to the connection interface 120, the articulating arms 122 may move the energy module 110 in a position closer to the autonomous vehicle 105. After positioning the energy module 110 closer to the autonomous vehicle 105, the autonomous vehicle 105 may commencing other operations, such as agricultural operations.

In some embodiments, before commencing other routines, the autonomous vehicle 105 may be configured to move a particular distance from a location where the electrical and mechanical coupling occurs. The autonomous vehicle 105 may move in a direction substantially normal to a surface of the energy module 110 that is closest to the autonomous vehicle 105. The particular distances may be a distance configured to avoid the energy module 110 contacting the replenishment station 115 or other device on which the energy module 110 was previously resting. The particular distance may be based on the size of the energy module 110, the configuration of the autonomous vehicle 105, such as the size, turning radius, and other configurations of the autonomous vehicle 105, and/or the size and configuration of the replenishment station 115.

In some embodiments, the replenishment station 115 may be configured to replenish the energy module 110. For example, when the energy module 110 is a battery, the replenishment station 115 may be configured to charge the energy module 110.

In some embodiments, when the autonomous vehicle 105 decouples the energy module 110, the autonomous vehicle 105 may place the energy module 110 onto a replenishment station 115 such that the energy module 110 may be autonomously replenished. For example, the autonomous vehicle 105 may position the energy module 110 on the replenishment station 115 such that electrical contacts of the energy module 110 contact electrical contacts of the replenishment station 115 to allow the replenishment station 115 to recharge the energy module 110. Alternately or additionally, the replenishment station 115 may be configured to replenish a fuel level of the energy module 110.

Figure 2:
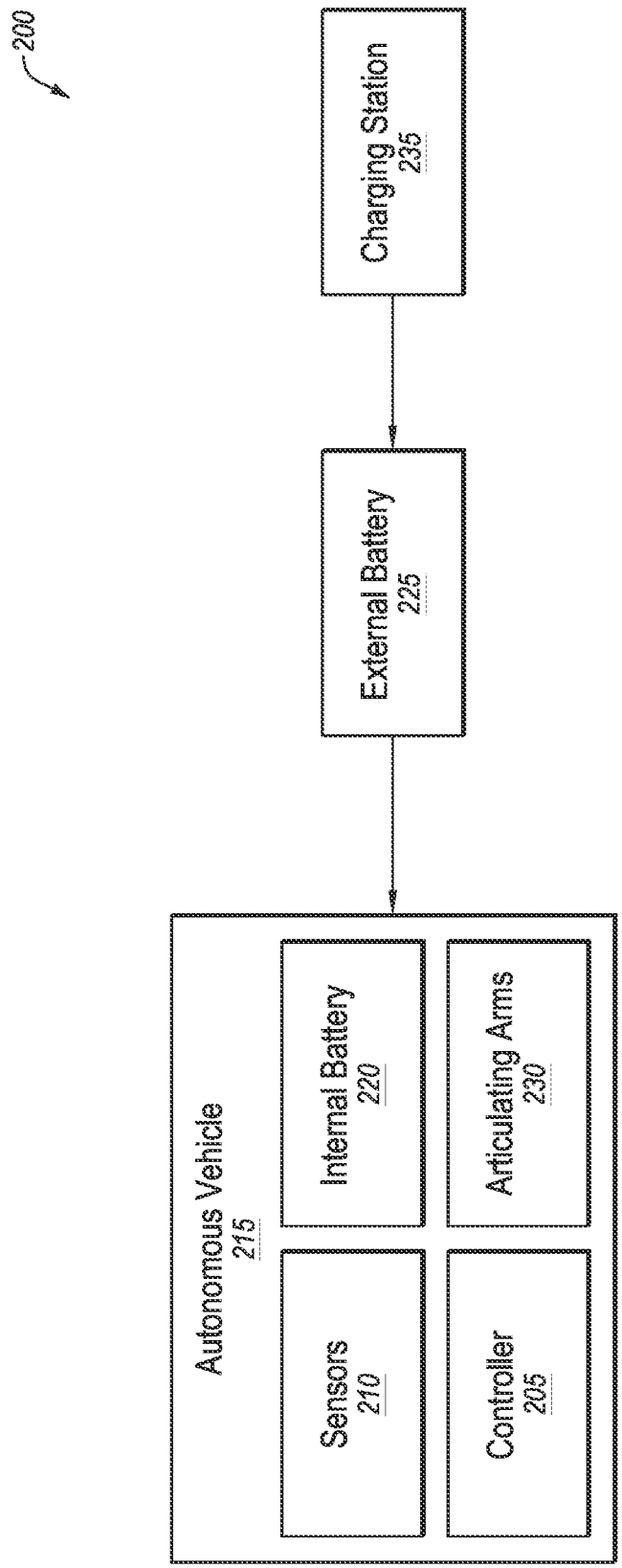
FIG. 2 is a block diagram of an example system 200 that includes autonomous electric vehicle (EV) replenishment.

FIG. 2 is a block diagram of an example system 200 that includes autonomous electric vehicle (EV) replenishment, in accordance with at least one embodiment described in the present disclosure. The system 200 may include a controller 205, sensors 210, an autonomous vehicle 215, an internal battery 220, an external battery 225, articulating arms 230, and charging station 235.

In some embodiments, one or more elements of the system 200 may be the same or similar as one or more elements of the environment 100 of FIG. 1. For example, the autonomous vehicle 215 may be the same or similar as the autonomous vehicle 105. In these and other embodiments, the same or similar elements between the system 200 and the environment 100 may be configured to operate, interface, and/or function in the same or similar fashion.

In some embodiments, some elements of the system 200 may be disposed on the autonomous vehicle 215. For example, the controller 205, the sensors 210, the internal battery 220, the articulating arms 230, etc., may be disposed on the autonomous vehicle 215. Alternatively, or additionally, one or more elements of the system 200 may be located remote from the autonomous vehicle 215. For example, one or more of the sensors 210 may be located remote from the autonomous vehicle 215, such as in a field or other setting the system 200 is configured to operate in. Alternatively, or additionally, one or more portions of the controller 205 may be located remote from the autonomous vehicle 215 such that one or more of data storage components and/or processing components related to the controller 205 may be conducted over a network. See the environment 600 of FIG. 6 for more details related to the network and communications with a remote system.

In some embodiments, the controller 205 may be configured to direct operations of the autonomous vehicle 215 in response to input from the sensors 210. For example, the controller 205 may use sensor data from the sensors 210 in directing the autonomous vehicle 215 to align with the charging station 235. In some embodiments, the controller 205 may be configured to direct the control of the articulating arms 230. Alternatively, or additionally, the controller 205 may be configured to direct the autonomous vehicle 215 to control operations related to the articulating arms 230. In general, the controller 205 may be configured to direct operations of the autonomous vehicle 215 and/or components associated with the autonomous vehicle 215 (e.g., the articulating arms 230) directly and/or indirectly through the autonomous vehicle 215.

In some embodiments, the controller 205 may direct operations of the autonomous vehicle 215 in response to an analysis of the internal battery 220 and/or the external battery 225. For example, in response to determining the energy level of the external battery 225 falling below a threshold, the controller 205 may direct the autonomous vehicle 215 to return to the charging station 235. Alternatively, or additionally, in response to the controller 205 determining the energy level of the internal battery 220 falling below a threshold, the controller 205 may direct the external battery 225 to charge the internal battery 220.

In some embodiments, the sensors 210 may be configured to determine operational and/or positional data of the autonomous vehicle 215, the internal battery 220, the external battery 225, and/or the articulating arms 230. In some embodiments, the sensors may include digital cameras, infrared sensors, radar sensors, lidar sensors, GPS, accelerometers, gyroscopes, and/or other sensors. In some embodiments, the controller 205 may use sensor data obtained from the sensors 210 to determine a coarse location of the autonomous vehicle 215 relative to another location and/or object. For example, the controller 205 may use coarse positional sensor data to determine the autonomous vehicle 215 location relative to the charging station 235 and the controller 205 may determine a path for the autonomous vehicle 215 to navigate to reach the charging station 235.

In some embodiments, the sensors 210 may be configured to produce fine positional sensor data that may be used by the controller 205 in directing operations associated with the autonomous vehicle 215 and/or components of the autonomous vehicle 215, such as the articulating arms 230. For example, fine positional sensor data from the sensors 210 may be used by the controller 205 to direct the autonomous vehicle 215 to align portions of the external battery 225 connected to the autonomous vehicle 215 with complementary connection points on the charging station 235. The autonomous vehicle 215 may attempt to off-load the external battery 225 to the charging station 235 such that the external battery 225 may charge. Alternatively, or additionally, the fine positional sensor data may be used by the controller 205 to direct the autonomous vehicle 215 to align with a disconnected external battery 225 such that the autonomous vehicle 215 may acquire the external battery 225 for use.

For example, the fine positional sensor data may be configured to determine a relative orientation and position of the disconnected external battery 225 with respect to the autonomous vehicle 215. In particular, the fine positional sensor data may be configured to determine a relative orientation and position of the disconnected external battery 225 with respect to a connection interface of the autonomous vehicle 215 that may electrically and mechanically couple to the disconnected external battery 225 via the articulating arms 230. In these and other embodiments, the controller 205 may determine a path that may align the connection interface with the disconnected external battery 225. In these and other embodiments, the controller 205 may follow the path such that the connection interface may electrically and mechanically couple to the disconnected external battery 225.

In some embodiments, the sensors 210 may be configured to produce fine positional sensor data based on markers on the external battery 225 and/or the charging station 235. For example, the second external battery 225 may include one or more markers that the sensors 210 may identify, such as in an image. The markers may be used to define a positional location and orientation of the external battery 225.

Alternately or additionally, the sensors 210 may be configured to produce the fine positional sensor data based on other data. For example, the sensors 210 may obtain an image of the external battery 225. Using the image, the controller 205 may recognize the external battery 225. Alternately or additionally, using the image, the controller 205 may determine a position of the external battery 225 and the orientation of the external battery 225 with respect to the autonomous vehicle 215. As another example, the sensors 210 may use lidar, radar, or some other imaging sensors to determine a position and/or orientation of the external battery 225 with respect to the autonomous vehicle 215.

In some embodiments, the controller 205 may be configured to perform one or more safety procedures when coupling the external battery 225 to the autonomous vehicle 215. For example, before coupling the connection interface to the external battery 225, the controller 205 may determine that the autonomous vehicle 215 is positioned at a particular distance from the external battery 225 to allow for the proper coupling of the external battery 225 to the autonomous vehicle 215.

In some embodiments, after performing movements to mechanically and/or electrically couple the connection interface to the external battery 225, the controller 205 may perform a safety procedure to ensure proper mechanical coupling between the autonomous vehicle 215 and the external battery 225. For example, the controller 205 may direct the arms 230 to raise the connection interface. In these and other embodiments, the sensors 210 may be configured to sense movement of the external battery 225 in response to raising the connection interface. In response to movement of the external battery 225 satisfying a threshold, the controller 205 may determine that the mechanical coupling of the external battery 225 to the connection interface is successful. As an example, when the autonomous vehicle 215 is successfully mechanically coupled to the external battery 225, movement of the arms 230 may result in movement of the external battery 225. As such, sensing the movement of the external battery 225 when the arms 230 move may indicate that the mechanical coupling is successful.

In response to movement of the external battery 225 not satisfying a threshold, the controller 205 may determine that the mechanical coupling of the external battery 225 to the connection interface was not successful. In these and other embodiments, the controller 205 may be configured to perform the procedures again to couple the external battery 225 to the autonomous vehicle 215.

In some embodiments, the threshold may be determined based on how much the controller 205 causes the arms 230 to raise. For example, raising the arms 230 four inches may result in the movement of the external battery 225 by four inches. In these and other embodiments, the threshold may be one, two, three, or four inches.

Figure 5:
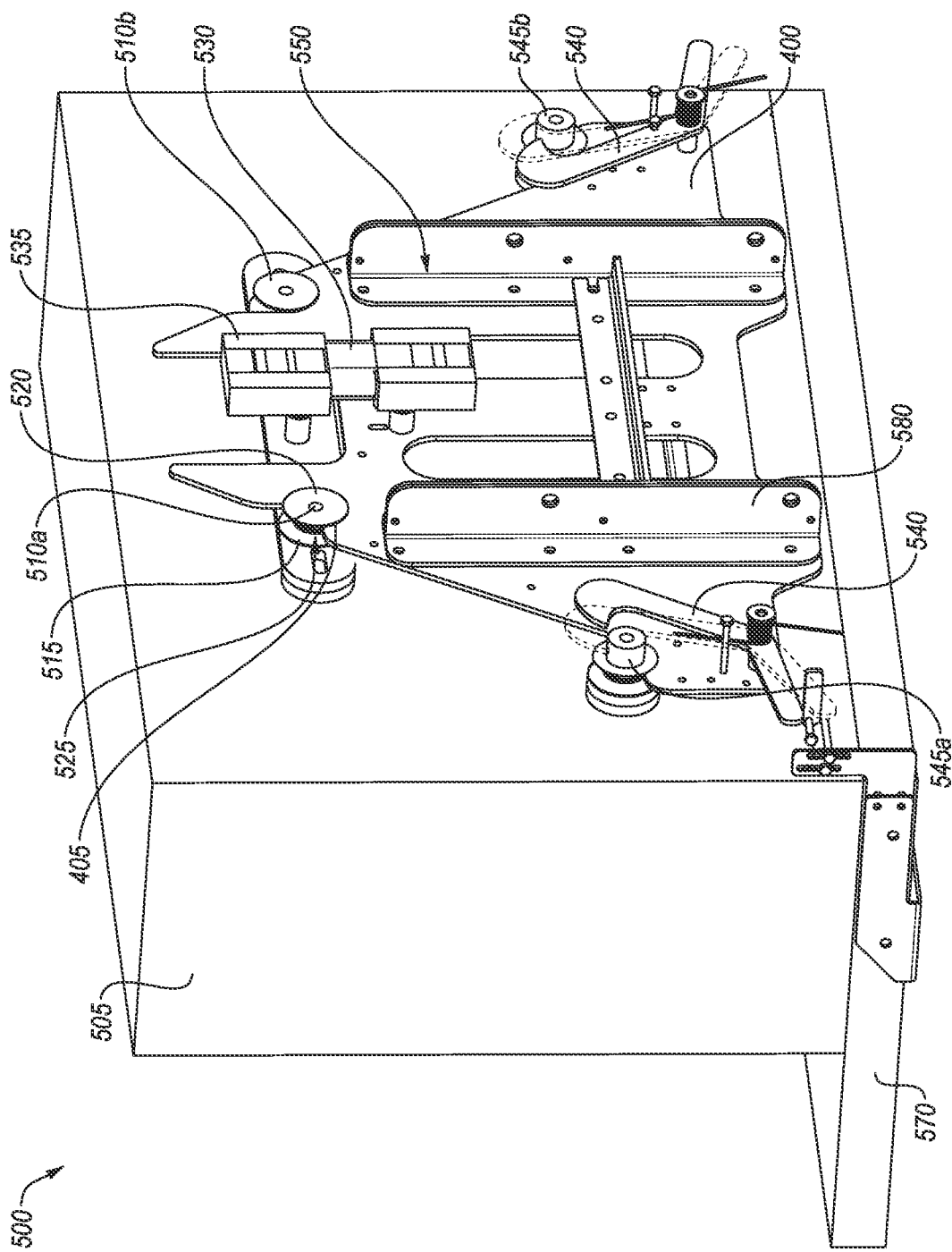
FIG. 5 is an environment that includes a perspective view of a connection interface and a battery.

In some embodiments, after performing movements to mechanically and/or electrically couple the connection interface to the external battery 225, the controller 205 may perform a safety procedure to ensure proper electrical coupling between the autonomous vehicle 215 and the external battery 225. In these and other embodiments, the connection interface may include an electrical coupler to electrically couple the autonomous vehicle 215 and the external battery 225. An example of the electrical coupler is illustrated in FIG. 5.

In some embodiments, the electrical coupler may include electrical connections to electrically connect the energy of the external battery 225 to the autonomous vehicle 215. For example, the electrical connections may include a one or more wires configured to conduct current from the external battery 225 to the autonomous vehicle 215. Alternately or additionally, the electrical coupler may include one or more data connections and/or one or more detection pins. In these and other embodiments, the controller 205 may sense an electrical connection with one or more of the detection pins and/or one or more data connections between the autonomous vehicle 215 and the external battery 225. In response to detecting the electrical connection with the one or more of the detection pins and/or the one or more data connection, the controller 205 may verify that the autonomous vehicle 215 is properly electrically connected to the external battery 225. In these and other embodiments, the controller 205 may operate to electrically connect the external battery 225 to the autonomous vehicle 215. In these and other embodiments, before verifying the electrical connection between the external battery 225 and the autonomous vehicle 215, the controller 205 may not electrically connect the external battery 225 to the autonomous vehicle 215.

In some embodiments, the external battery 225 may be configured to provide power to the autonomous vehicle 215. For example, in instances in which the external battery 225 includes an energy level above a threshold, the autonomous vehicle 215 may draw energy from the external battery 225 for any operation the autonomous vehicle 215 is configured to perform. In some embodiments, the external battery 225 may be configured to provide energy to the internal battery 220. For example, in instances in which the controller 205 determines the energy level of the internal battery 220 is below a threshold amount, the controller 205 may direct the external battery 225 to charge the internal battery 220 to a threshold amount or greater.

In some embodiments, the internal battery 220 may be configured to provide power to the autonomous vehicle 215 in instances in which the external battery 225 may not be connected or instances in which the external battery 225 may be discharged. In some embodiments, the energy capacity of the internal battery 220 may be less than the energy capacity of the external battery 225. Alternatively, or additionally, the energy capacity of the internal battery 220 may be substantially similar and/or greater than the energy capacity of the external battery 225.

In an example use case, the sensors 210 may obtain sensor data associated with an energy level of the external battery 225. The controller 205 may determine the energy level is below a first threshold and the controller 205 may direct the autonomous vehicle 215 to return to the charging station 235. In some embodiments, the first threshold may be variable and/or may be determined by the controller 205. For example, the controller 205 may be configured to determine the first threshold using one or more factors associated with the autonomous vehicle 215, such as a distance between the autonomous vehicle 215 and the charging station 235, a path route from the autonomous vehicle 215 to the charging station 235, the type of operation being performed by the autonomous vehicle 215, the weight of the autonomous vehicle 215, a battery health of the external battery 225, and/or other factors associated with the autonomous vehicle 215.

The controller 205 may provide coordinates and a path for the autonomous vehicle 215 to return to the charging station 235 using sensor data from the sensors 210. Upon returning to the charging station 235, the controller 205 may use sensor data from the sensors 210 to align the autonomous vehicle 215 and/or the external battery 225 with the charging station 235. The controller 205 may obtain the energy level of the internal battery 220 and verify the energy level is greater than a second threshold amount. In instances in which the energy level of the internal battery 220 is below the second threshold, the controller 205 may cause the external battery 225 to charge the internal battery 220 up to the second threshold amount. In some embodiments, the second threshold may be variable and/or may be determined by the controller 205. For example, the controller 205 may be configured to determine the second threshold using one or more factors associated with the autonomous vehicle 215 and/or the charging station 235 or another charging station (e.g., a second charging station), such as a distance between the current location of the autonomous vehicle 215 and the second external battery 225, a weight of the autonomous vehicle 215, a battery health of the internal battery 220, and/or other factors associated with the autonomous vehicle 215.

Once aligned, the controller 205 may cause the articulating arms 230 to lower the external battery 225, cause one or more contacts on the external battery 225 to interface with one or more contacts on the charging station 235, and disengage the external battery 225, which may cause the external battery 225 to begin charging. The controller 205 may cause the autonomous vehicle 215 to align with a second external battery 225 at another charging station 235, using the sensors 210 to align and the internal battery 220 to supply the power to move the autonomous vehicle 215 to the second external battery 225. Once aligned with the second external battery 225, the controller 205 may direct the autonomous vehicle 215 to engage the second external battery 225. The controller 205 may direct the articulating arms 230 to raise the second external battery 225 and the autonomous vehicle 215 may continue operations as directed by the controller 205.

Modifications, additions, or omissions may be made to the system 200 without departing from the scope of the present disclosure. For example, in some embodiments, the system 200 may include any number of other components that may not be explicitly illustrated or described. In some embodiments, the system 200 may include multiple external batteries. In some embodiments, the system 200 may not include a charging station 235. Alternatively, or additionally, the system 200 may include multiple charging stations.

Figure 3:
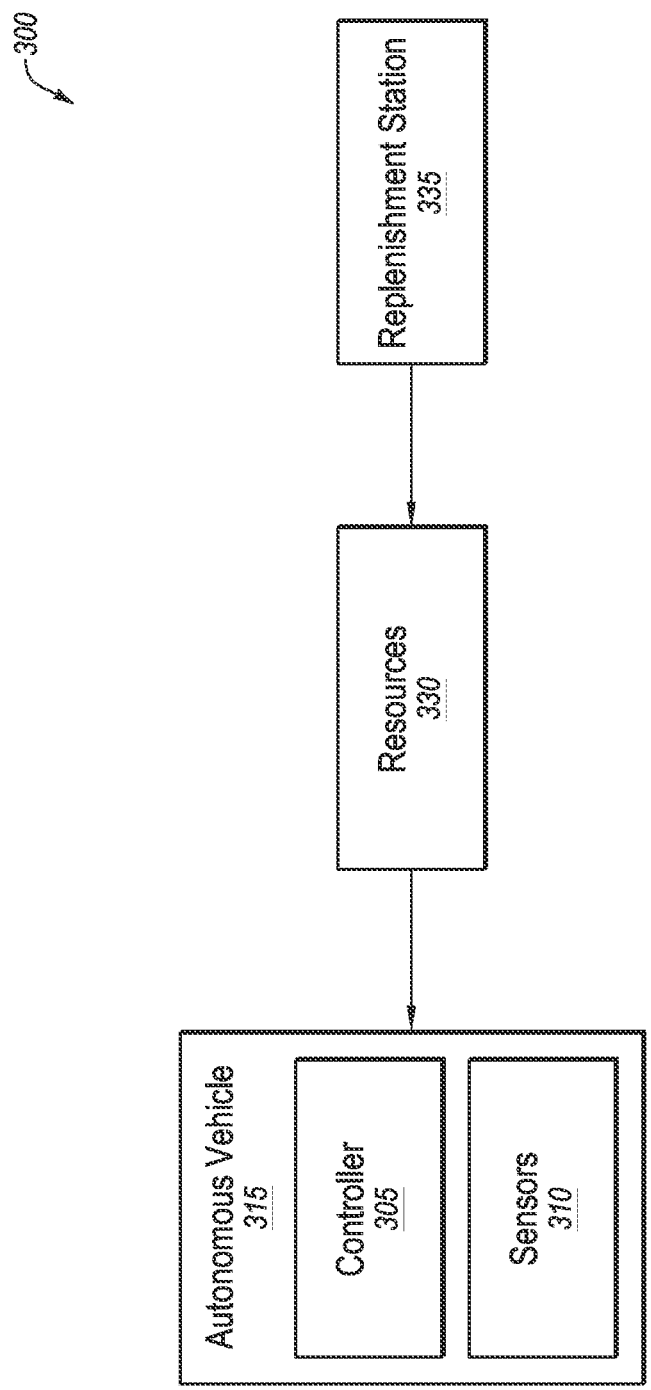
FIG. 3 is a block diagram of an example system of autonomous resource replenishment.

FIG. 3 is a block diagram of an example system 300 of autonomous resource replenishment, in accordance with at least one embodiment described in the present disclosure. The system 300 may include a controller 305, sensors 310, an autonomous vehicle 315, resources 330, and a replenishment station 335.

In some embodiments, some elements of the system 300 may be disposed on the autonomous vehicle 315. For example, the controller 305, the sensors 310, the resources 330, etc., may be disposed on the autonomous vehicle 315. Alternatively, or additionally, one or more elements of the system 300 may be located remote from the autonomous vehicle 315. For example, one or more of the sensors 310 may be located remote from the autonomous vehicle 315, such as in a field or other setting the system 300 may be configured to operate in. Alternatively or additionally, one or more portions of the controller 305 may be located remote from the autonomous vehicle 315 such that one or more of data storage components and/or processing components related to the controller 305 may be conducted over a network. See the environment 600 of FIG. 6 for more details related to the network and communications with a remote system.

The controller 305 may include code and routines configured to enable a computing system to perform one or more operations. Alternatively, or additionally, the controller 305 may be implemented using hardware including a processor, a microprocessor (e.g., to perform or control performance of one or more operations), a field-programmable gate array (FPGA), or an application-specific integrated circuit (ASIC). In some other instances, the controller 305 may be implemented using a combination of hardware and software. In the present disclosure, operations described as being performed by the controller 305 may include operations that the controller 305 may direct a corresponding system to perform. Further, although described separately in the present disclosure to ease explanation of different operations performed and roles, in some embodiments, one or more portions of the controller 305 may be combined or part of the same module. In some embodiments, the operation of the controller 305 may be performed by a computing system, such as the computing system 900 of FIG. 9.

In some embodiments, the controller 305 may be configured to direct operations of the autonomous vehicle 315, which may be in response to input from the sensors 310. For example, the controller 305 may use sensor data from the sensors 310 in directing the autonomous vehicle 315 to align with the replenishment station 335. In some embodiments, the controller 305 may be configured to direct the autonomous vehicle 315 to control operations related to the resources 330. For example, in instances in which the resources 330 include sprayable fertilizer, the controller 305 may direct the autonomous vehicle 315 and/or associated components of the autonomous vehicle 315 to deliver the sprayable fertilizer. In general, the controller 305 may be configured to direct operations of the autonomous vehicle 315 and/or components associated with the autonomous vehicle 315 directly and/or indirectly through the autonomous vehicle 315.

In some embodiments, the controller 305 may direct operations of the autonomous vehicle 315 in response to an analysis of sensor data from the sensors 310 and/or the resources 330. For example, in response to determining a resource amount of the resources 330 falling below a threshold, such as via sensor data from the sensors 310, the controller 305 may direct the autonomous vehicle 315 to navigate to the replenishment station 335. For example, in instances in which the resources 330 include fuel, such as diesel fuel, and sensor data from the sensors 310 indicate that the level of fuel has dropped below a threshold, the controller 305 may direct the autonomous vehicle 315 to navigate to the replenishment station 335, which replenishment station 335 may include a fuel station, and the autonomous vehicle 315 may obtain additional fuel such that the resources 330 (e.g., diesel fuel) may be replenished.

In some embodiments, the controller 305 may be configured to determine replenishment operations based on the threshold, where each resource associated with the system 300 may include a threshold. The threshold may be associated with a ratio of a current resource level to a maximum resource level. In some embodiments, the threshold may include a predetermined value. For example, the threshold may be predetermined to be approximately ten percent (e.g., the current resource level divided by the maximum resource level is approximately ten percent) such that in instances in which the resource level falls below ten percent, the controller 305 may direct the autonomous vehicle 315 to navigate to the replenishment station 335 for the resource.

Alternatively, or additionally, the threshold may be determined by the controller 305 based on threshold input parameters. For example, a threshold input parameter may include a proximity to the replenishment station 335. As the proximity of the autonomous vehicle 315 changes relative to the distance from the replenishment station 335, the controller 305 may adjust the threshold accordingly. For example, in instances in which the autonomous vehicle 315 is near a replenishment station 335, the controller 305 may determine the threshold to be higher as replenishing the resource may be easier and/or less disruptive to the autonomous vehicle 315 tasks than instances in which the autonomous vehicle 315 is distant from a replenishment station 335.

Alternatively, or additionally, the threshold input parameters may include a planned resource expenditure by the autonomous vehicle 315. The planned resource expenditure may include any one or combinations of a rate of resource consumption, a task size, a number of other autonomous systems performing the task, a task prioritization, and the like. For example, in instances in which multiple autonomous vehicles are operating in concert to perform a task, the controller 305 may determine to lower the threshold. In another example, in instances in which the controller 305 determines the rate of consumption of a resource, the controller 305 may adjust the threshold such that the autonomous vehicle 315 may complete an element of the task before navigating to the replenishment station 335.

In these and other embodiments, the controller 305 may be configured to determine the threshold using combinations of the proximity of the autonomous vehicle 315 to a replenishment station 335 and the planned resource expenditure, as described above. For example, the controller 305 may obtain the proximity of the autonomous vehicle 315 relative to the replenishment station 335, the rate of resource consumption, and the number and location of other autonomous vehicles performing the same or similar task, and the controller 305 may adjust the threshold in view of the threshold input parameters. The controller 305 may be configured to vary the threshold which may reduce operation time, reduce resources expended, prioritize one task over another task, and the like.

In some embodiments, the sensors 310 may be communicatively coupled with the controller 305. For example, sensor data may be produced by the sensors 310 and the controller 305 may obtain the sensor data from the sensors 310, such as through a transmission of the sensor data, for additional processing by the controller 305. In some embodiments, the sensors 310 may be configured to communicate with the controller 305 via a wired connection. For example, a wired connection between the sensors 310 and the controller 305 may include one or more cables such as ethernet, fiber optic, serial, coaxial, and/or other similar wired connections. Alternatively, or additionally, the sensors 310 may be configured to communicate with the controller 305 via a wireless connection. For example, the wireless connection may include Bluetooth®, Wi-Fi, WiMAX, cellular communications, and/or other similar wireless communications.

In some embodiments, the sensors 310 may be configured to determine operational and/or positional data of the autonomous vehicle 315 and/or the resources 330. In some embodiments, the sensors may include digital cameras, infrared sensors, radar sensors, lidar sensors, GPS, accelerometers, gyroscopes, ultrasonic sensors, pressure sensors, and/or other sensors. In some embodiments, the controller 305 may use sensor data obtained from the sensors 310 to determine a coarse location of the autonomous vehicle 315 relative to another location and/or object. For example, the controller 305 may use coarse positional sensor data to determine the location of the autonomous vehicle 315 relative to the replenishment station 335 and the controller 305 may determine a path for the autonomous vehicle 315 to navigate to reach the replenishment station 335.

In some embodiments, the sensors 310 may be configured to produce fine positional sensor data that may be used by the controller 305 in directing operations associated with the autonomous vehicle 315 and/or components of the autonomous vehicle 315, such as attached implements, actuators, or other devices. For example, fine positional sensor data from the sensors 310 may be used by the controller 305 to direct the autonomous vehicle 315 to align with complementary portions of the replenishment station 335. For example, see FIG. 3 and the associated description which includes aligning portions of a battery with a battery charging device. Alternatively, or additionally, the controller 305 may be configured to direct the autonomous vehicle 315 using alignment materials and/or computer vision. For example, in instances in which the autonomous vehicle 315 is attempting to align with the replenishment station 335, the sensors 310 may scan one or more signs associated with the replenishment station 335 to obtain location data which location data may be obtained by the controller 305 and used to align the autonomous vehicle 315 with the replenishment station 335.

In some embodiments, the sensors 310 may be disposed on the autonomous vehicle 315. For example, the sensors 310 may be located on various portions of the autonomous vehicle 315 such as a front portion, a rear portion, a bottom portion (e.g., the underbody of the autonomous vehicle 315), a top portion (e.g., mounted to a cab portion and/or a hood portion of the autonomous vehicle 315), etc. Alternatively, or additionally, the sensors 310 may be disposed on an associated object with which the autonomous vehicle 315 may be configured to interact. For example, the sensors 310 may be disposed on the replenishment station 335 and may contribute to aligning the autonomous vehicle 315 with the replenishment station 335. Alternatively, or additionally, the sensors 310 may be remote from the autonomous vehicle 315 and/or an associated object. For example, the sensors 310 may be disposed in an observatory location that may provide a view of the autonomous vehicle 315 and/or the object the autonomous vehicle 315 may interact with, such as the replenishment station 335.

In some embodiments, the sensors 310 may be used in conjunction with safety measures of the autonomous vehicle 315. For example, the sensors 310 may be disposed on portions of the autonomous vehicle 315 and/or moving parts of the autonomous vehicle 315 and the sensors 310 may be configured to obtain sensor data such as through observing (e.g., from vision-based sensors such as a camera) or sensing (e.g., from touch or pressure-based sensors such as a force sensor) potential obstructions and the controller 305 may cause the autonomous vehicle 315 to halt operations based on the sensor data.

In some embodiments, the resources 330 may be used by the autonomous vehicle 315 as an energy source for the autonomous vehicle 315. For example, the resources 330 may include fuel, such as diesel fuel, hydrogen fuel, charged electric batteries, and the like. Alternatively, or additionally, the resources 330 may include products or treatments to be applied by the autonomous vehicle 315 within an area of operation. For example, the resources 330 may include fertilizers, herbicides, pesticides, fungicides, seeds to be planted, and the like. In these and other embodiments, the system 300 may be configured to obtain a level of the resources 330 and in response to the level of the resources 330 falling below a threshold, may navigate to the replenishment station 335 to obtain additional resources 330. For example, the sensors 310 may obtain sensor data associated with the resources 330. In response to the controller 305 determining the resources 330 are below a threshold level from the sensor data, the controller 305 may direct the autonomous vehicle 315 to navigate to the replenishment stations 335 where the resources 330 may be replenished.

In some embodiments, the replenishment station 335 may include a resource reservoir that may be used to replenish the resources 330 once the autonomous vehicle 315 is aligned with the replenishment station 335. In some embodiments, the replenishment stations 335 may include a nursing tank. In some embodiments, the replenishment station 335 may be disposed at or near an area of operation of the system 300. Alternatively, or additionally, the replenishment station 335 may be remote from the area of operation of the system 300, such that the autonomous vehicle 315 may travel to the replenishment station 335 as needed.

In some embodiments, the replenishment station 335 may be configured to replenish the resources 330 upon receiving a transmission from the controller 305. For example, the controller 305 may determine that the autonomous vehicle 315 is aligned with the replenishment station 335 and the controller 305 may transmit a request to the replenishment station 335 to begin replenishing the resources 330. In some embodiments, the controller 305 may be obtain the level of the resources 330 such as via the sensors 310 as the replenishment station 335 replenishes the resources 330. The controller 305 may be configured to transmit a cease operation signal to the replenishment station 335 in response to determining the level of the resources 330 is greater than a threshold.

In some embodiments, the controller 305 may be configured to monitor a resource level for each of the resources 330 being utilized by the autonomous vehicle 315. In instances in which the controller 305 determines one or more of the resource levels of the resources 330 are below a threshold (e.g., a "depleted resource"), the controller 305 may direct the autonomous vehicle 315 to navigate to the replenishment station 335 associated with the depleted resource. Additionally, the controller 305 may obtain each resource level of the resources 330 which are above the respective threshold (e.g., "non-depleted resources") and the controller 305 may make a determination regarding replenishing the non-depleted resources.

For example, an autonomous system configured to deliver fertilizer and pesticide may include a controller that may determine the fertilizer is below a threshold and cause the autonomous system to navigate to a fertilizer replenishment station to replenish the fertilizer. Additionally, the controller may determine that based on a pesticide resource level and/or a proximity of the pesticide replenishment station to the fertilizer replenishment station or the path between the autonomous system and the fertilizer replenishment station, the autonomous system may navigate to the pesticide replenishment station to replenish the pesticide. Additionally, the controller may determine that based on an energy resource level (e.g., a battery charge level) and/or a proximity of the energy replenishment station to the fertilizer replenishment station or the path between the autonomous system and the fertilizer replenishment station, the autonomous system may not navigate to the energy replenishment station and not replenish the energy.

For example, the controller may determine the amount of energy remaining in the autonomous system may be sufficient to complete the fertilizer and pesticide task. Alternatively, or additionally, the controller may determine that the autonomous system may be more productive by replenishing the energy resource at a different time than the replenishment of the fertilizer and/or the pesticide. For example, the controller may determine that the autonomous system may deplete the fertilizer resource at twice the rate of the energy resource, such that the autonomous system may replenish the energy resource less frequently than the fertilizer resource. The controller may determine that the autonomous system may deplete the pesticide resource slower than the fertilizer resource but navigating to the pesticide replenishment station separately from the fertilizer replenishment station may waste time and/or other resources (e.g., the energy resource).

In an example use case, the sensors 310 may obtain sensor data associated with a first resource level of the resources 330. In response to the sensor data, the controller 305 may determine the first resource level is below a first threshold and the controller 305 may direct the autonomous vehicle 315 to navigate to the replenishment station 335 to replenish the first resource of the resources 330. Alternatively, or additionally, the sensors 310 may obtain sensor data associated with a second resource level of the resources 330. In response to the sensor data, the controller 305 may determine the second resource level is below a second threshold and the controller 305 may direct the autonomous vehicle 315 to navigate to the replenishment station 335 to replenish the second resource of the resources 330.

In some embodiments, the first threshold and/or the second threshold may include a variable threshold and/or may be determined by the controller 305. For example, the controller 305 may be configured to determine the first threshold and/or the second threshold using one or more factors associated with the autonomous vehicle 315, such as a distance between the autonomous vehicle 315 and the replenishment station 335, a path route from the autonomous vehicle 315 to the replenishment station 335, the type of operation being performed by the autonomous vehicle 315, the weight of the autonomous vehicle 315, and/or other factors associated with the autonomous vehicle 315 and/or the operating environment of the autonomous vehicle 315.

The controller 305 may provide coordinates and a path for the autonomous vehicle 315 to navigate to the replenishment station 335, such as by using sensor data from the sensors 310. Upon the autonomous vehicle 315 returning to the replenishment station 335, the controller 305 may use sensor data from the sensors 310 to align the autonomous vehicle 315 with the replenishment station 335.

Once the autonomous vehicle 315 is aligned with the replenishment station 335, the replenishment station 335 may replenish the depleted resources 330 of the autonomous vehicle 315, such as upon receiving a command from the controller 305. The resources 330 that may be replenished by the replenishment station 335 may include elements that may be used by the autonomous vehicle 315 (e.g., such as fuel or other consumable inputs) or may be distributed by the autonomous vehicle 315 (e.g., seeds, pesticides, herbicides, fungicides, etc.)

Modifications, additions, or omissions may be made to the system 300 without departing from the scope of the present disclosure. For example, in some embodiments, the system 300 may include any number of other components that may not be explicitly illustrated or described. In some embodiments, the system 300 may include multiple resources 330, which multiple resources 330 may differ from one another. For example, a first resource may include fuel, a second resource may include a pesticide, and a third resource may include seeds. Alternatively, or additionally, the system 300 may include multiple replenishment stations 335, such as a different replenishment station 335 for each different resource included used by the autonomous vehicle 315. Referring to the previous example, there may be a first station to replenish fuel, a second station to replenish pesticides, and a third station to replenish seeds.

In some embodiments, the system 300 may include additional elements that may be associated with the distribution and/or consumption of the resources 330. For example, the autonomous vehicle 315 may include a sprayer, a planting device, and/or other implements that may be configured to spray pesticides, plant seeds, and the like. In these and other embodiments, the controller 305 may be configured to direct operations of the additional elements directly or indirectly. For example, the controller 305 may transmit a command to the additional elements to direct operations thereof and/or the controller 305 may transmit a command to the autonomous vehicle 315 to control the operation of the additional elements.

Figure 4:
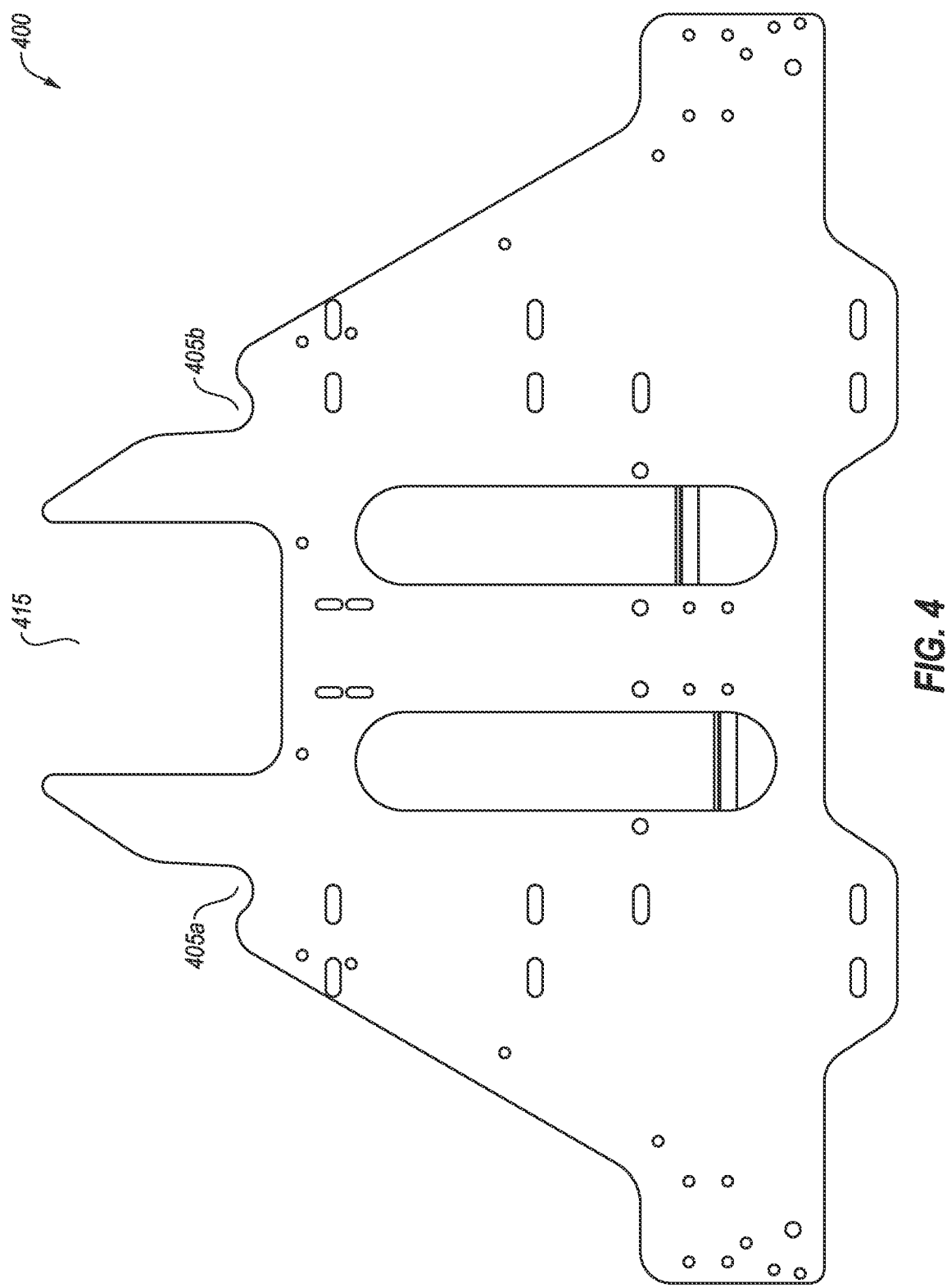
FIG. 4 is a front view of an alignment device.

FIG. 4 is a front view of an alignment device 400, according to one or more embodiments. In some embodiments, the alignment device 400 may be part of a connection interface of an autonomous vehicle. The alignment device 400 may be configured to assist in mechanically coupling the autonomous vehicle to a battery.

In some embodiments, the alignment device 400 may include a first receptacle 405a, a second receptacle 405b, collectively the receptacles 405. The receptacles 405 to be configured to mate with alignment extensions associated with a battery, as illustrated, and discussed relative to FIG. 5. The receptacles 405 may be configured such that when the alignment device 400 is not perfectly aligned with the alignment extensions of the battery, the receptacles 405 may direct the alignment extensions to the proper location to facilitate the mechanical coupling of the autonomous vehicle to the battery.

The alignment device 400 may further include an electrical coupler aperture 415. The data link aperture 415 may provide space for the electrical coupler of the battery and vehicle to connect as illustrated in FIG. 5.

In some embodiments, the alignment device 400 may include one or more protrusions, not illustrated. The protrusions may extend outward from a surface of the alignment device 400. For example, the protrusions may be cone shaped or some of the shape with a diameter that decreases as the protrusions extends away from the surface of the alignment device 400. In these and other embodiments, the battery may include one or more cavities that may have a similar shape as the protrusions. For example, the cavities may have an opposite shape with a diameter that decreases as the cavity extends into the battery. In these and other embodiments, to align the alignment device 400 with the battery, the smaller end of the protrusion may be initially aligned anywhere within a circumference of the cavity at the surface of the battery where circumference of the cavity is largest. In these and other embodiments, as the alignment device 400 is moved closer to the battery, the protrusion extends into the cavity. As the protrusion extends further into the cavity the diameter of the cavity reduces causing the protrusion to further align with a center of the cavity and thereby further align the alignment device 400 with the battery.

Modifications, additions, or omissions may be made to the alignment device 400 without departing from the scope of the present disclosure. For example, in some embodiments, the alignment device 400 may include additional receptacles 405.

FIG. 5 is an environment 500 that includes a perspective view of a connection interface 550 and a battery 505, according to one or more embodiments. The connection interface 550 may be configured to mechanically and electrically couple to the battery 505. In some embodiments, the connection interface 550 that may include the alignment device 400, the first electrical coupler 530, multiple locking mechanism 540, and supports 580 to couple to the aperture arms of an autonomous vehicle.

The battery 505 may include a first alignment extension 510a and a second alignment extension 510b, referred to collectively as the alignment extensions 510. Each of the alignment extensions 510 may have a first end that is proximate to the battery 505 and a second end that is distal to the battery 505. Each of the alignment extensions 510 may further include disks with an aperture 525 therebetween. For example, the first alignment extension 510a may include a first disk 515 and a second disk 520 with the aperture 525 therebetween.

The first disk 515 may be arranged on the first end of the first alignment extension 510a. The first disk 515 may have a first sloped surface. The first sloped surface may be in a first plane that is orthogonal to second plane. In some embodiments, the second plane may be a plane in which the alignment device 400 extends given that the shape of the alignment device 400 is a plate. The second disk 520 may be arranged on the second end of the first alignment extension 510a. The second disk 520 may have a second sloped surface. The second sloped surface may be in the first plane and opposite the first sloped surface. Further the first sloped surface and the second sloped surface may form a frusto-conical like shape. In these and other embodiments, the second disk 520 and the first disk 515 may be arranged to define the aperture 525 therebetween. The aperture 525 may be sized and shaped to mate with the receptacles 405 of the connection interface 550.

In some embodiments, the first disk 515 and the second disk 520 may be formed of a material that has elastic properties, such as rubber or some other material that has comparable properties of rubber. The material of the first disk 515 and the second disk 520 may be used to guide the alignment device 400 to cause the receptacles 405 to mate with the alignment extensions 510 in the apertures 525. Further, the alignment device 400 may be shaped above the receptacles 405 to align the receptacles 405 with the alignment extensions 510.

To engage the connection interface 550 with the battery 505, the connection interface 550 may be positioned in a position lower than the position illustrated in FIG. 5. In these and other embodiments, the connection interface 550 may be a particular distance from the battery 505. The connection interface 550 may be raised until the alignment extensions 510 mate with the receptacles 405.

In some embodiments, the battery 505 may further include a second electrical coupler 535 configured to mate with the first electrical coupler 530 of the connection interface 550. For example, the first electrical coupler 530 may include a protrusions that may enter a cavity of the second electrical coupler 535 as the connection interface 550 is raised to mate with the battery 505. The mating of the first electrical coupler 530 with the second electrical coupler 535 may seat contacts in the first electrical coupler 530 on contacts on the second electrical coupler 535 to electrically couple the connection interface 550 to the battery 505.

In some embodiments, the battery 505 may further include a first locking extension 545a and second locking extension 545b, referred to as the locking extensions 545. The locking extensions 545 may include disks similar to the alignment extensions 510 that form apertures that may mate with portions of the alignment device 400. Further, the locking extensions 545 may include portions that may mate with the locking mechanism 540 of the connection interface 550. For example, the locking mechanism 540 may include a curve portion that may mate with the locking extensions 545.

In some embodiments, the locking mechanism 540 may be pivotable coupled to the alignment device 400 and coupled to springs. The springs may be configured to apply a tension to the locking mechanism 540 to maintain the locking mechanism 540 mated or engaged with the locking extensions 545 when the battery 505 is coupled to the connection interface 550. The locking mechanism 540 may include an extension that may interact with an extension of a support 570 for the battery 505. When the battery 505 is placed on the support 570, the extension of the support 570 may overcome the tension of the spring and pivot the curved portion of the locking mechanism 540 away from the locking extensions 545 to disengage the locking mechanism 540 from the locking extensions 545. When the battery 505 is lifted by the connection interface 550, the extension of the support 570 may disengage with the locking mechanism 540 and the spring may pivot the locking mechanism 540 into engagement with the locking extensions 545.

Modifications, additions, or omissions may be made to the environment 500 without departing from the scope of the present disclosure.

Figure 6:
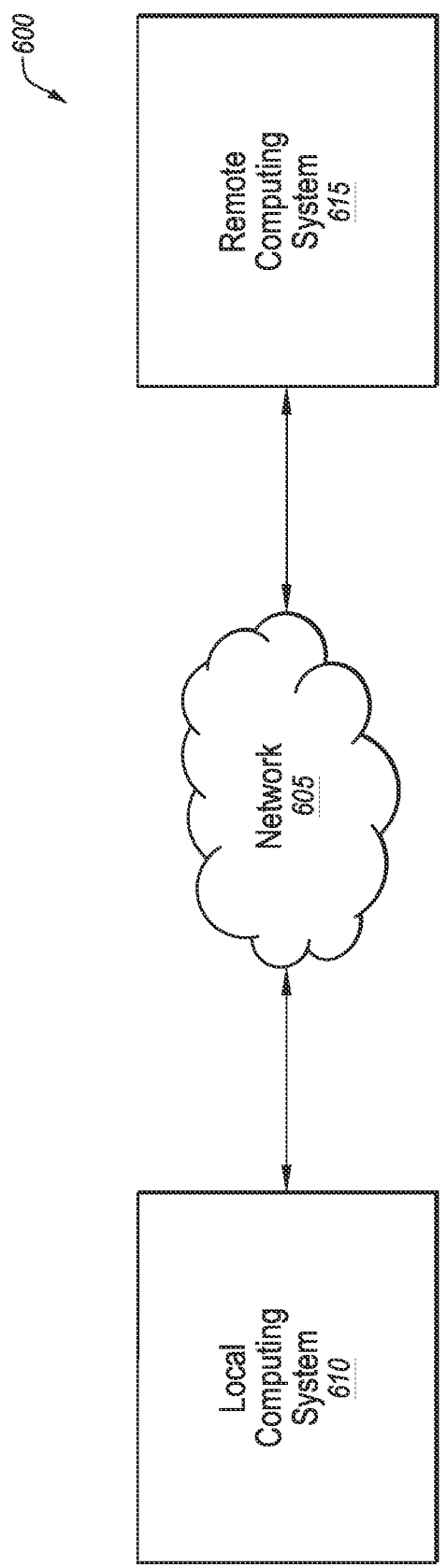
FIG. 6 is a block diagram of an example environment that includes multiple computing systems connected to a network.

FIG. 6 is a block diagram of an example environment 600 that includes multiple computing systems connected to a network, according to at least one embodiment of the present disclosure. The environment 600 may include a network 605, a local computing system 610, and a remote computing system 615.

In some embodiments, the network 605 may be configured to communicatively couple the local computing system 610 and the remote computing system 615. In some embodiments, the network 605 may be any network or configuration of networks configured to send and receive communications between systems. In some embodiments, the network 605 may include a wired network, an optical network, and/or a wireless network, and may include numerous different configurations, including multiple different types of networks, network connections, and protocols to communicatively couple systems in the environment 600.

In some embodiments, the local computing system 610 may be analogous to the controller 205 of FIG. 2 and/or the controller 305 of FIG. 3. The local computing system 610 may be configured to perform operations that may include receiving sensor data from one or more sensors, such as the sensors 310 of FIG. 3 and/or the sensors 210 of FIG. 2, performing an analysis on the sensor data, and transmitting commands to additional elements such as to the autonomous vehicle 105 of FIG. 1 and/or to the autonomous vehicle 215 of FIG. 2. For example, the local computing system 610 may be configured to determine from the sensor data that an external battery is depleted below a threshold amount and the local computing system 610 may cause the autonomous vehicle to navigate to a charging station.

In some embodiments, the remote computing system 615 may be configured to receive and store data that may be transmitted over the network 605. For example, the remote computing system 615 may receive sensor data from the local computing system 610 over the network 605. In some embodiments, the remote computing system 615 may be configured to perform an analysis on the received and/or stored sensor data. In some embodiments, the remote computing system 615 may be configured to transmit results of the analysis to the local computing system 610 over the network 605, and the local computing system 610 may be configured to use the transmitted analysis results to direct operation of an autonomous vehicle.

In some embodiments, the local computing system 610 and the remote computing system 615 may be configured to perform parallel analyses on sensor data, which may improve the rate at which the analysis of the sensor data is completed. For example, the local computing system 610 may be configured to analyze a first portion of sensor data and the remote computing system 615 may be configured to analyze a second portion of sensor data. In some embodiments, the local computing system 610 may be configured to join the analysis of the sensor data by the local computing system 610 with the analysis of the sensor data by the remote computing system 615 to generate a complete analysis of the sensor data. Alternatively, or additionally, the remote computing system 615 may be configured to receive portions of analyzed data and may be configured to create a complete analysis of the sensor data, which may be transmitted to the local computing system 610 over the network 605.

Figure 9:
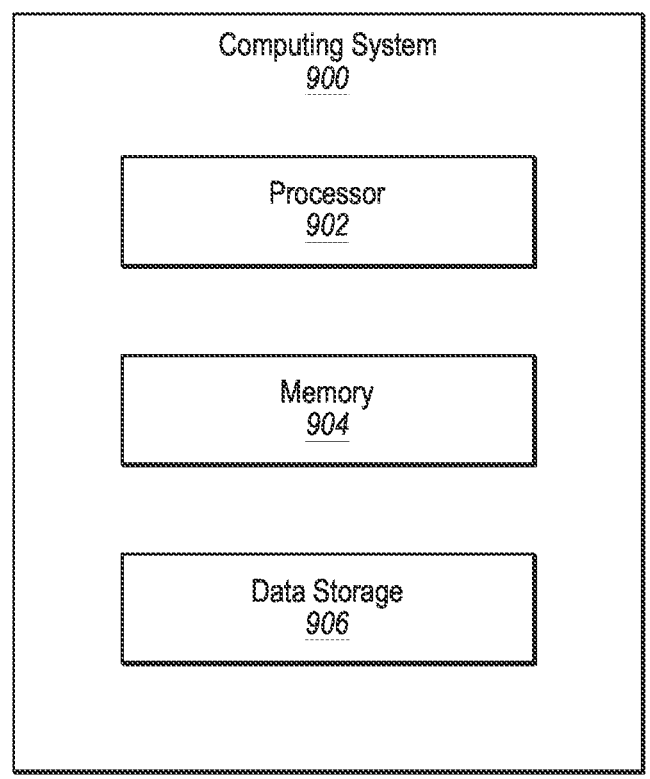
FIG. 9 illustrates a block diagram of an example computing system, all arranged according to one or more embodiments.

In some embodiments, some or all of the operations performed by the local computing system 610 and/or the remote computing system 615 may be performed by a computing system, such as the computing system 900 of FIG. 9.

Modifications, additions, or omissions may be made to the environment 600 without departing from the scope of the present disclosure. For example, in some embodiments, the environment 600 may include more than two computing systems that may be configured to communicate through the network 605. Alternatively, or additionally, the environment 600 may include any number of other components that may not be explicitly illustrated or described.

Figure 7:
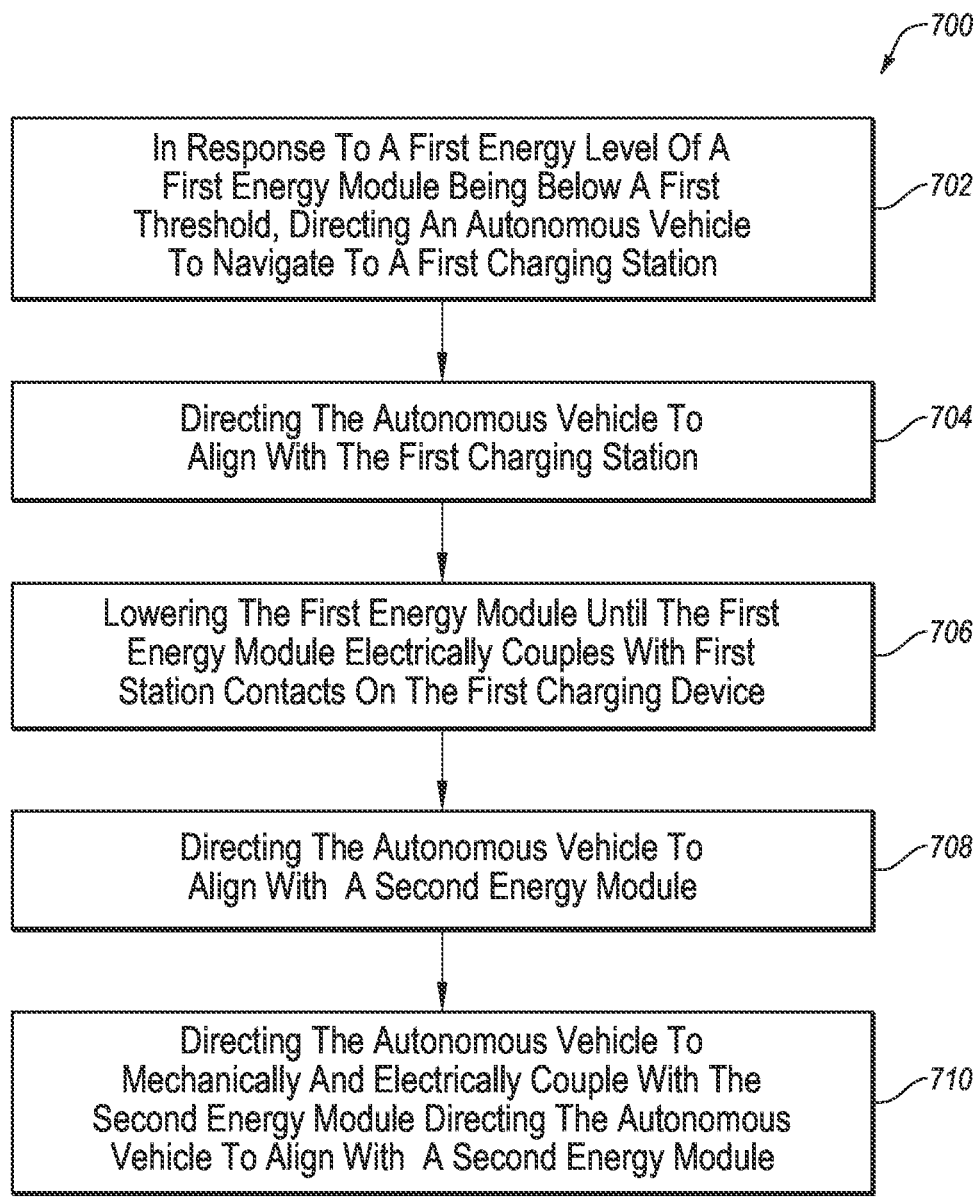
FIG. 7 illustrates a flowchart of an example method of an autonomous EV replenishment.

FIG. 7 illustrates a flowchart of an example method 700 of an autonomous EV replenishment. The method 700 may be arranged in accordance with at least one embodiment described in the present disclosure. One or more operations of the method 700 may be performed, in some embodiments, by a device or system, such as the autonomous vehicle 105 of FIG. 1, the controller 205 of FIG. 2, the controller 305 of FIG. 3 or another device, combination of devices, or system. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 700 may begin at block 702 where an autonomous vehicle may be directed to navigate to a first charging station in response to a first energy level of a first energy module being below a threshold.

At block 704, the autonomous vehicle may be directed to align with the first charging station. For example, the autonomous vehicle may align a position and an orientation of the autonomous vehicle based on the charging station.

At block 706, the first energy module may be lowered until the first energy module electrically couples with first station contacts on the first charging station. After lowering the first energy module, the autonomous vehicle may mechanically and electrically decouple the first energy module from the autonomous vehicle. For example, the autonomous vehicle may lower a connection interface of the autonomous vehicle to disengage the connection interface from the first energy module.

At block 708, the autonomous vehicle may be directed to align with a second energy module. The second energy module may be located on a second charging station. To align the autonomous vehicle with a second energy module, one or more of the location and the orientation of the autonomous vehicle may be adjusted with respect to the second energy module. Alternately or additionally, one or more of the location and the orientation of the connection interface of the autonomous vehicle may be adjusted with respect to the second energy module.

At block 710, the autonomous vehicle may be directed to mechanically and electrically couple with the second energy module.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, wherein the first energy module is decoupled, the first energy module may be automatically charged by the charging station.

As another example, the method 700 may further include obtaining sensor data associated with an area that includes the second energy module and identifying a location of the second energy module in the area using the sensor data. In these and other embodiments, the method 700 may further include wherein the adjusting the one or more of: a location and an orientation of a battery connection interface of the autonomous vehicle is based on the identified location of the second energy module.

In some embodiments, the electrical and mechanical coupling of the second energy module to the autonomous vehicle may include raising the connection interface of the autonomous vehicle and sensing for movement of the second energy module in response to raising the connection interface. In response to movement of the second energy module satisfying a movement threshold, determining the mechanical coupling of the second battery to the autonomous vehicle is successful. In response to movement of the second energy module not satisfying the movement threshold, redirecting the electrical and mechanical coupling of the second energy module to the autonomous vehicle.

As another example, the method 700 may further include in response to determining the second energy module is coupled to the autonomous vehicle, directing the autonomous vehicle to move a particular distance from a location where the electrical and mechanical coupling occurs in a direction substantially normal to a surface of the second battery that is closest to the autonomous vehicle before commencing additional operations.

Figure 8:
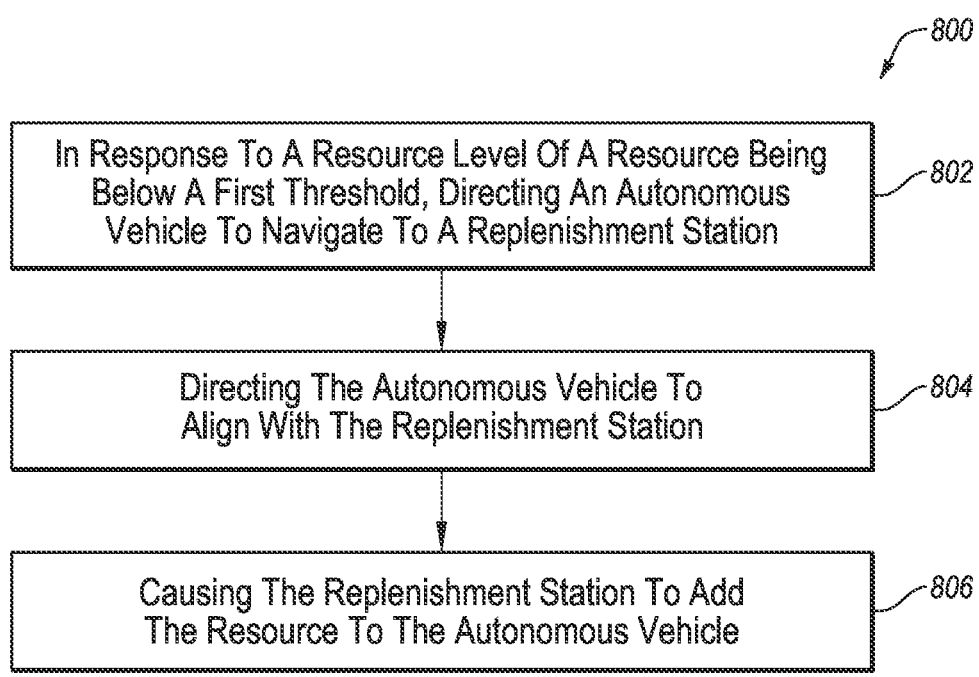
FIG. 8 illustrates a flowchart of an example method of autonomous replenishment of resources.

FIG. 8 illustrates a flowchart of an example method 800 of autonomous replenishment of resources. The method 800 may be arranged in accordance with at least one embodiment described in the present disclosure. One or more operations of the method 800 may be performed, in some embodiments, by a device or system, such as the autonomous vehicle 105 of FIG. 1, the controller 205 of FIG. 2, the controller 305 of FIG. 3 or another device, combination of devices, or system. In these and other embodiments, the method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 800 may begin at block 802 where an autonomous vehicle may be directed to navigate to a replenishment station in response to a resource level of a resource being below a first threshold.

At block 804, the autonomous vehicle may be directed to align with the replenishment station. For example, using sensor data, the autonomous vehicle may adjust a position and/or an orientation of the autonomous vehicle with respect to the replenishment station.

At block 806, the replenishment station may be caused to add the resource to the autonomous vehicle. In some embodiments, the replenishment station may add the resource until the resource level is greater than a second threshold.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

FIG. 9 illustrates a block diagram of an example computing system 900, according to at least one embodiment of the present disclosure. The computing system 900 may be configured to implement or direct one or more operations associated with an autonomous vehicle (e.g., such as the autonomous vehicle 105 of FIG. 1, the controller 205 of FIG. 2, the controller 305 of FIG. 3). The computing system 900 may include a processor 902, a memory 904, and a data storage 906. The processor 902, the memory 904, and the data storage 906 may be communicatively coupled.

In general, the processor 902 may include any suitable special-purpose or general-purpose computer, computing entity, or processing device including various computer hardware or software modules and may be configured to execute instructions stored on any applicable computer-readable storage media. For example, the processor 902 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 9, the processor 902 may include any number of processors configured to, individually or collectively, perform or direct performance of any number of operations described in the present disclosure. Additionally, one or more of the processors may be present on one or more different electronic devices, such as different servers.

In some embodiments, the processor 902 may be configured to interpret and/or execute program instructions and/or process data stored in the memory 904, the data storage 906, or the memory 904 and the data storage 906. In some embodiments, the processor 902 may fetch program instructions from the data storage 906 and load the program instructions in the memory 904. After the program instructions are loaded into memory 904, the processor 902 may execute the program instructions.

For example, in some embodiments, the modification module may be included in the data storage 906 as program instructions. The processor 902 may fetch the program instructions of a corresponding module from the data storage 906 and may load the program instructions of the corresponding module in the memory 904. After the program instructions of the corresponding module are loaded into memory 904, the processor 902 may execute the program instructions such that the computing system may implement the operations associated with the corresponding module as directed by the instructions.

The memory 904 and the data storage 906 may include computer-readable storage media for carrying or having computer-executable instructions or data structures stored thereon. Such computer-readable storage media may include any available media that may be accessed by a general-purpose or special-purpose computer, such as the processor 902. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 902 to perform a certain operation or group of operations.

Modifications, additions, or omissions may be made to the computing system 900 without departing from the scope of the present disclosure. For example, in some embodiments, the computing system 900 may include any number of other components that may not be explicitly illustrated or described.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." This interpretation of the phrase "A or B" is still applicable even though the term "A and/or B" may be used at times to include the possibilities of "A" or "B" or "A and B." All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, the scope of the invention is intended to be defined only by the claims which follow.

What is claimed is:

1. An agricultural vehicle comprising:
a battery connection interface to electrically and mechanically couple an exchangeable battery to the agricultural vehicle such that the battery provides energy to power operations of the agricultural vehicle; and
a computing device configured to execute instructions to cause performance of:
autonomous exchange operations, the exchange operations including direct the agricultural vehicle to autonomous replace a connected exchangeable battery with another exchangeable battery; and
safety operations, the safety operations including one or more of:
direct the agricultural vehicle to reattempt the autonomous exchange operations in response to determining movement of the exchangeable battery does not satisfy a threshold; and
cause the agricultural vehicle to move a particular distance from a location where the electrical and mechanical coupling occurs in a direction substantially normal to a surface of the exchangeable battery that is closest to the agricultural vehicle before commencing additional operations.

2. The agricultural vehicle of claim 1, further comprising a reserve battery configured to provide energy to the agricultural vehicle when the exchangeable battery is electrically decoupled from the agricultural vehicle.

3. The agricultural vehicle of claim 2, wherein in response to a reserve energy satisfying a reserve threshold, the exchange operations further comprise automatically charge the reserve battery using energy from the exchangeable battery.

4. The agricultural vehicle of claim 1, wherein the battery connection interface includes electrical connectors and one or more pins, and the autonomous exchange operations further include:
determine a connection between the one or more pins and the exchangeable battery; and
in response to determining the connection, electrically coupling the exchangeable battery with the agricultural vehicle.

5. The agricultural vehicle of claim 1, wherein the battery connection interface comprises an alignment device disposed on the agricultural vehicle to align and mechanically couple the exchangeable battery with the agricultural vehicle.

6. The agricultural vehicle of claim 5, wherein the alignment device includes one or more protrusions to interface with one or more depressions disposed on the exchangeable battery, the one or more depressions being complementary to the one or more protrusions.

7. The agricultural vehicle of claim 5, wherein:
the alignment device includes one or more receptacles arranged in a first plane; and
the exchangeable battery includes:
one or more extensions having a first end that is proximate to the battery and a second end that is distal to the battery;
a first disk attached to the first end and having a first sloped surface in a second plane, the second plane being orthogonal to the first plane; and
a second disk attached to the second end having a second sloped surface in the second plane and opposite the first sloped surface, arranged relative to the first disk to define an aperture that is sized and shaped to mate with the one or more receptacles.

8. The agricultural vehicle of claim 1, wherein the battery connection interface further comprises a locking mechanism configured to engage with the exchangeable battery.

9. The agricultural vehicle of claim 1, further comprising one or more sensors to generate sensor data associated with the agricultural vehicle relative to the exchangeable battery, wherein the computing device is configured to execute instructions to direct performance of alignment operations, the alignment operations comprising:
adjusting one or more of: a location and an orientation of the battery connection interface with respect to the exchangeable battery using the sensor data.

10. The agricultural vehicle of claim 9, wherein the sensor data is generated by the one or more sensors in response to identifying one or more markers associated with the exchangeable battery.

11. An agricultural vehicle comprising:
a removable energy module configured to provide energy to power operations of the agricultural vehicle, the removable energy module including one or more extensions having a first end that is proximate to the removable energy module and a second end that is distal to the removable energy module; and
a connection interface configured to autonomous mechanically and electrically couple and decouple the removable energy module to the agricultural vehicle, the removable energy module when coupled to the connection interface being positioned behind the agricultural vehicle,
wherein the connection interface comprises an alignment device disposed on the agricultural vehicle to align and mechanically couple the removable energy module with the agricultural vehicle, the alignment device including one or more receptacles; and the one or more extensions of the removable energy module is configured to interface with the one or more receptacles to couple the removable energy module to the connection interface.

12. The agricultural vehicle of claim 11, wherein the connection interface further comprises a locking mechanism configured to:
automatically engage with the removable energy module in response to the connection interface lifting the removable energy module; and
automatically disengage with the removable energy module as the removable energy module is support by another device.

13. A method comprising:
in response to an energy level of a first battery of an agricultural vehicle satisfying an energy level threshold, autonomously decoupling the first battery from the agricultural vehicle;
after decoupling the first battery, adjusting one or more of: a location and an orientation of a battery connection interface of the agricultural vehicle with respect to a second battery;
after the adjusting, directing autonomous electrical and mechanical coupling of the second battery to the agricultural vehicle, the autonomous electrical and mechanical coupling including:
raising the battery connection interface of the agricultural vehicle; and
sensing for movement of the second battery in response to raising the battery connection interface; and
in response to determining the second battery is coupled to the agricultural vehicle, directing the agricultural vehicle to move a particular distance from a location where the autonomous electrical and mechanical coupling occurs in a direction substantially normal to a surface of the second battery that is closest to the agricultural vehicle before commencing additional operations.

14. The method of claim 13, further comprising in response to the energy level satisfying the energy level threshold, aligning the first battery with a charging station,
wherein the first battery is decoupled from the agricultural vehicle by placing the first battery at the charging station such that the first battery is automatically charged by the charging station.

15. The method of claim 13, further comprising:
obtaining sensor data associated with an area that includes the second battery; and
identifying a location of the second battery in the area using the sensor data,
wherein the adjusting the one or more of: the location and the orientation of the battery connection interface of the agricultural vehicle is based on the identified location of the second battery.

16. The method of claim 13, wherein the directing the autonomous electrical and mechanical coupling of the second battery to the agricultural vehicle further includes in response to movement of the second battery satisfying a movement threshold, determining the mechanical coupling of the battery to the agricultural vehicle is successful, wherein in response to movement of the second battery not satisfying the movement threshold the autonomous electrical and mechanical coupling of the second battery to the agricultural vehicle is redirected.

17. The agricultural vehicle of claim 11, wherein the one or more receptacles are arranged in a first plane and the removable energy module further includes:
a first disk attached to the first end and having a first sloped surface in a second plane, the second plane being orthogonal to the first plane; and
a second disk attached to the second end having a second sloped surface in the second plane and opposite the first sloped surface, arranged relative to the first disk to define an aperature that is sized and shaped to mate with the one or more receptacles.

* * * * *